March 2, 1937.  H. L. MAGNON  2,072,762
CULTIVATOR
Filed July 6, 1936  2 Sheets-Sheet 1

Harry L. Magnon, INVENTOR
BY Victor J. Evans & Co.
ATTORNEYS

March 2, 1937.   H. L. MAGNON   2,072,762
CULTIVATOR
Filed July 6, 1936   2 Sheets-Sheet 2
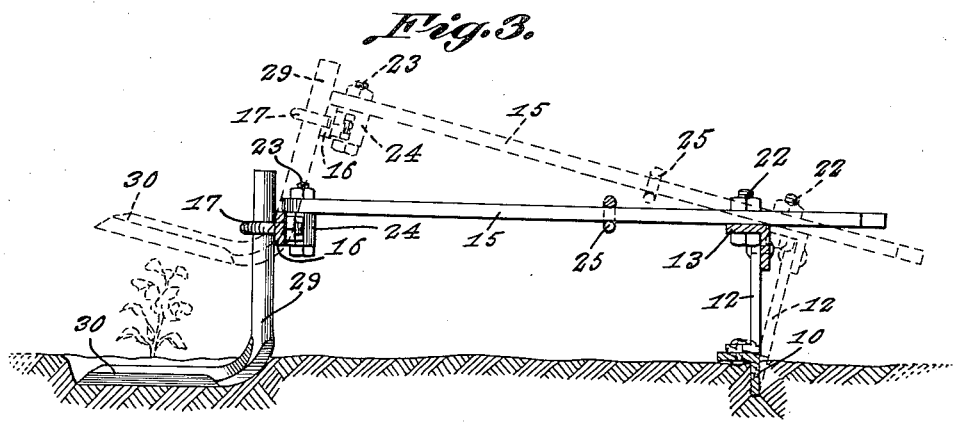
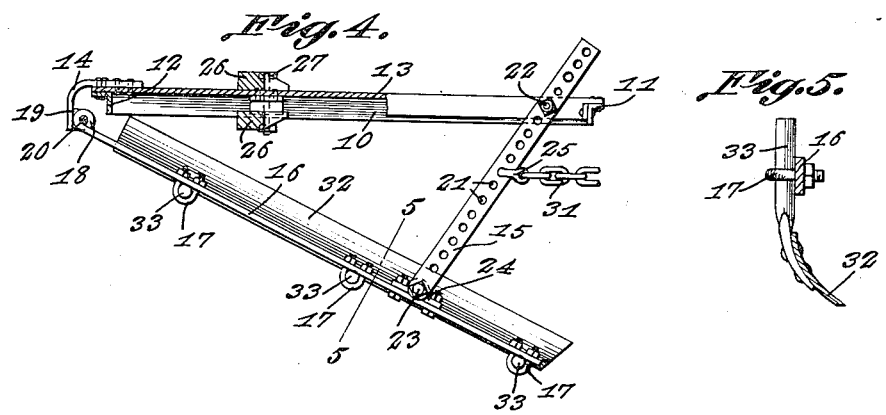 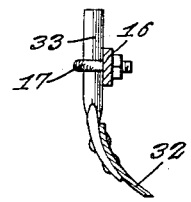
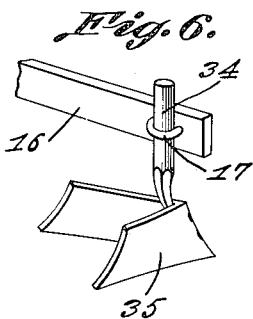 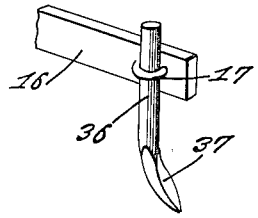
Harry L. Magnon, INVENTOR
BY Victor J. Evans & Co.
ATTORNEYS Patented Mar. 2, 1937

2,072,762

UNITED STATES PATENT OFFICE 2,072,762

CULTIVATOR

Harry L. Magnon, Dover, Fla.

Application July 6, 1936, Serial No. 89,212

3 Claims. (Cl. 97—170)

This invention relates to cultivators and has for an object to provide a cultivator having a runner which is thin and has its front and rear end portions bent upwardly, the runner cutting into the ground enough to hold the cultivator on a steady straight course, the runner being designed to trail directly behind the horse and grip the ground against the side draft of the cultivator teeth, whereby the cultivator is easy to control.

A further object is to provide a cultivator having an outrigger bar disposed at an oblique forward angle with respect to the cultivator beam whereby the forward ground working implement will roll the dirt in and around small plants and cover small weeds and grass, the next one behind will fill in the furrow left by the first one, and so on down to the base of the bed or ridge being cultivated.

A further object is to provide ground working tools which may be used to selectively cultivate deeply or to scrape off a too-high bed, or to cultivate shallow.

A still further object is to provide a cultivator which will be formed of a few strong simple and durable parts, which will be easy to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 3 is a cross sectional view taken on the line 3—3 of Figure 1.

Figure 4 is a detail plan view of the cultivator with parts in section, and showing the cultivator equipped with a scraper blade.

Figure 5 is a cross sectional view taken on the line 5—5 of Figure 4.

Figure 6 is a perspective view showing the tool used for forming a shallow furrow along the top of the bed for planting tomato plants or other plants in a row.

Figure 7 is a perspective view showing the tool used for deep cultivation.

Figure 1:
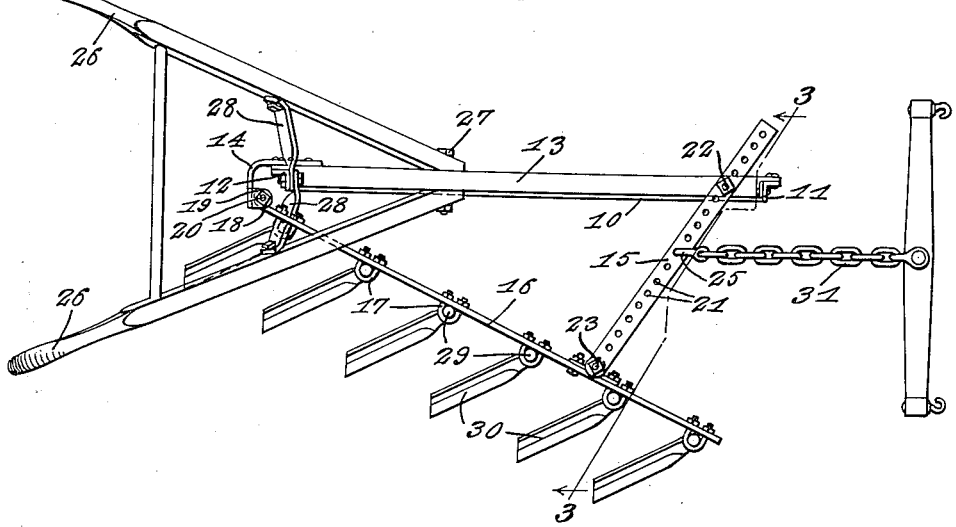
Figure 1 is a plan view of a cultivator constructed in accordance with the invention.

Referring now to the drawings in which like characters of reference designate similar parts in the various views, 10 designates a runner formed of angle iron and having the ends bent vertically upward as shown at 11 and 12 in Figure 3 so that the runner resembles a sled runner. A cultivator beam 13 is secured to the upwardly bent portions of the runner. A bracket 14 extends laterally from the rear end of the beam, and a cross bar brace 15 extends laterally from the front end of the beam, the cross bar brace being longer than the bracket.

An outrigger bar 16 is provided with U-bolts 17 at intervals to interchangeably mount the shanks of ground working tools later described. The outrigger bar is provided with a hinge eye 18, best shown in Figure 4, through which and a similar eye 19, on the bracket 14, a pivot pin 20 is passed to permit the outrigger bar to be swung toward and away from the beam.

The cross brace 15 is provided with a longitudinal series of openings 21 which selectively receive a bolt 22 carried by the beam. A pivot bolt 23 is passed through the outer end of the cross brace and through a hinge eye 24, on the outrigger bar, as best shown in Figure 2.

A single tree hook 25 may be passed selectively through openings 21 so that the runner 10 will trail behind the draft animal.

Inclined handles 26 are bolted to the beam 13, as shown at 27 in Figure 1, and braces 28 are secured to the beam and to the handles to rigidly secure the parts together.

Figure 2:
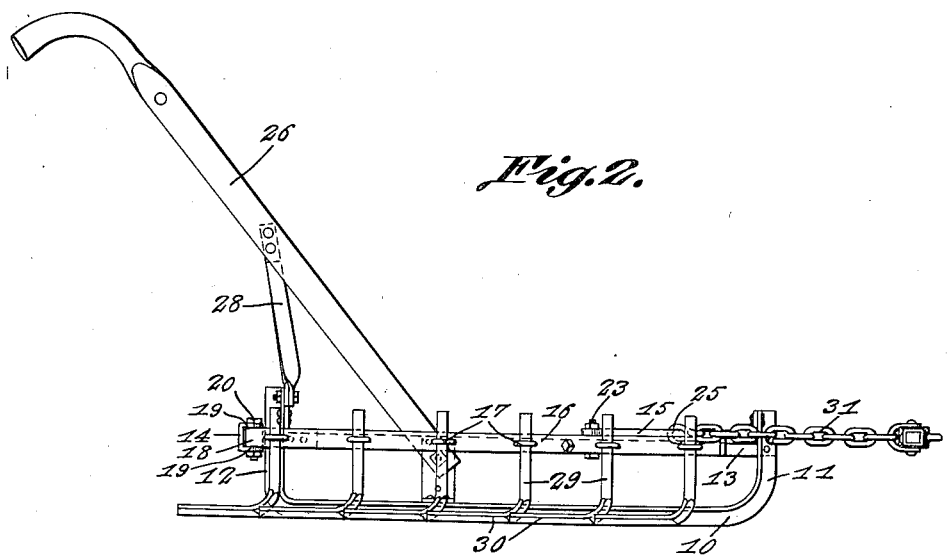
Figure 2 is a side elevation of the cultivator shown in Figure 1.

As shown in Figures 1, 2, and 3, the shank 29 of a shallow cultivating tool may be secured in each of the U-bolts 17. The shallow cultivating tool is provided with a trailing blade 30. The operator may rock the cultivator on the angle iron runner 10 to lift the outrigger bar and blades over plants and also to vary the depth of penetration of the blades. The blades are set at an oblique angle with respect to the draft chain 31 and since the latter is disposed on the brace bar between the beam and the outrigger bar, as best shown in Figure 1, the runner will not only trail directly behind the draft animal but will grip the ground against the side draft of the cultivator blades and thus promote easy control of the cultivator at all times.

In cultivating with the shallow cultivating tool the tool at the outer end of the outrigger bar next to the plants will sweep or roll the earth in and around the small plants and cover small weeds and grass. The next succeeding tool will fill in the furrow left by the first tool and so on down to the tool next the beam or that tool next to the base of the bed being cultivated.

As shown in Figure 4, a blade 32 is adapted to be interchangeably received with the shallow ground working tools 30, and for this purpose the blade is provided with a plurality of shanks 33 which are adapted to be received in the U-bolts 17. The blade is used to scrape off too-high beds and deposit clods of grass and loose earth along the edge of the bed in a diagonal motion similar to a road grader, leaving a clear smooth surface for seeding or setting plants.

As shown best in Figure 6, the U-bolts 17 also are adapted to interchangeably receive the shanks 34 of V-shaped blades 35 which may be used to cut a furrow in the bed for planting tomato plants or other plants in a row. Likewise, as shown in Figure 7, the U-bolts 17 may interchangeably receive the shanks 36 of spike-like tools 37 which may be used for deep cultivation.

From the above description it will be seen that a cultivator is provided in which the runner penetrates the ground directly in rear of the draft animal and grips the ground against the side draft of the cultivator ground working tools of whatever type that may be used, and thus the easy manipulation of the cultivator is greatly promoted while the sled runner shape of the runner permits it to ride easily over roots, trash and other obstacles, in a smooth steady motion, while at the same time promoting light draft on the animal while working thus allowing the operator to give his entire attention to close and thorough work during the cultivating operation.

What is claimed is:

1. A cultivator comprising a runner having its front and rear ends directed upwardly, a beam above the runner connected to said ends, an outrigger bar hinged at the rear end to the beam and extending obliquely forward from the beam, a cross brace connecting the bar to the beam, draft means connected to said brace, and ground working tools on the outrigger bar, said runner penetrating the ground and contracting the side draft of said ground working tools.

2. A cultivator comprising an angle iron runner having its front and rear end portions bent upwardly, a beam carried by said end portions above the runner, the flange of the runner being adapted to penetrate the ground and to ride smoothly over debris, an outrigger bar extending obliquely forward from the rear end of the beam, a cross brace connecting the forward end of the bar to the forward end of the beam, and ground working tools carried by the outrigger bar and set at an angle to the bar, said flange of the runner contracting the side draft of said ground working tools.

3. A cultivator comprising a runner having its front and rear end portions bent upwardly, a beam carried by said end portions above the runner, an outrigger bar hinged at the rear end to the beam and extending outwardly and forwardly from the beam, a cross brace provided with a longitudinal series of openings, a pivot bolt passed through one of the openings and through the cross brace, a pivot bolt passed through another of the openings and through the beam, a draft means engaged in another of the openings intermediate said bolts, and ground working tools on the outrigger bar, said runner having a thin portion adapted to grip the ground against the side draft of said ground working tools.

HARRY L. MAGNON.